United States Patent [19]

Torobin

[11] 4,303,736
[45] Dec. 1, 1981

[54] HOLLOW PLASTIC MICROSPHERES

[76] Inventor: Leonard Torobin, 13433 N.E. 45th St., Bellevue, Wash. 98004

[21] Appl. No.: 103,417

[22] Filed: Dec. 13, 1979

Related U.S. Application Data

[60] Division of Ser. No. 59,296, Jul. 20, 1979, abandoned, which is a continuation-in-part of Ser. No. 937,123, Aug. 28, 1978, abandoned, which is a continuation-in-part of Ser. No. 944,643, Sep. 21, 1978, abandoned.

[51] Int. Cl.³ .................. B32B 5/16; B22B 17/06
[52] U.S. Cl. .................. 428/403; 126/450; 428/407; 521/54; 521/57; 521/136
[58] Field of Search ............. 65/21, 22, 60 C; 264/5, 264/12, 14, 22, 42, 50, 70, 142, 167, 173; 521/54, 57, 136; 428/402, 403, 407, 408; 206/0.6; 126/450

[56] References Cited

U.S. PATENT DOCUMENTS

| | | | |
|---|---|---|---|
| 948,541 | 2/1910 | Coleman | 65/22 |
| 1,871,792 | 8/1932 | Horsfield | 65/21 X |
| 3,186,812 | 6/1965 | Pfaender | 65/55 |
| 3,325,341 | 6/1967 | Shannon | 65/22 X |
| 3,607,169 | 9/1971 | Coxe | 65/21 |
| 3,615,972 | 10/1971 | Morehouse et al. | 156/79 |
| 3,769,770 | 11/1973 | Deschamps et al. | 52/404 |
| 4,033,324 | 7/1977 | Eckels | 126/270 |

OTHER PUBLICATIONS

Materials Engineering, "Microspheres Cut Costs, Improve Properties of Plastics", pp. 58, 59, 4–1975.
Chemical Engineering, "Microencapsulation", pp. 177, 178, 12/1967.
Journal of Applied Physics, "Selection and Measurement of Microspheres Laser Targets on Refraction", vol. 47, #6, 6-1976, pp. 2502–2508.

Primary Examiner—Robert L. Lindsay, Jr.
Attorney, Agent, or Firm—Perry Carvellas

[57] ABSTRACT

Hollow plastic microspheres made from thermoplastic or thermosetting plastic compositions are described.

The hollow plastic microspheres can be used as filler materials in plastics, in plastic foam compositions and in concrete and asphalt compositions. The hollow plastic microspheres can be made from low heat conductivity plastic compositions and blown with a low heat conductivity gas and used to make improved insulation materials and composites and insulating systems.

The hollow plastic microspheres can be made to contain a thin transparent or reflective metal coating deposited on the inner wall surface of the microspheres by adding to the blowing gas small dispersed metal particles and/or gases of organo metal compounds and decomposing the organo metal compounds.

The hollow plastic microspheres can also be made in the form of filamented plastic microspheres with a thin plastic filament connecting adjacent plastic microspheres.

37 Claims, 12 Drawing Figures

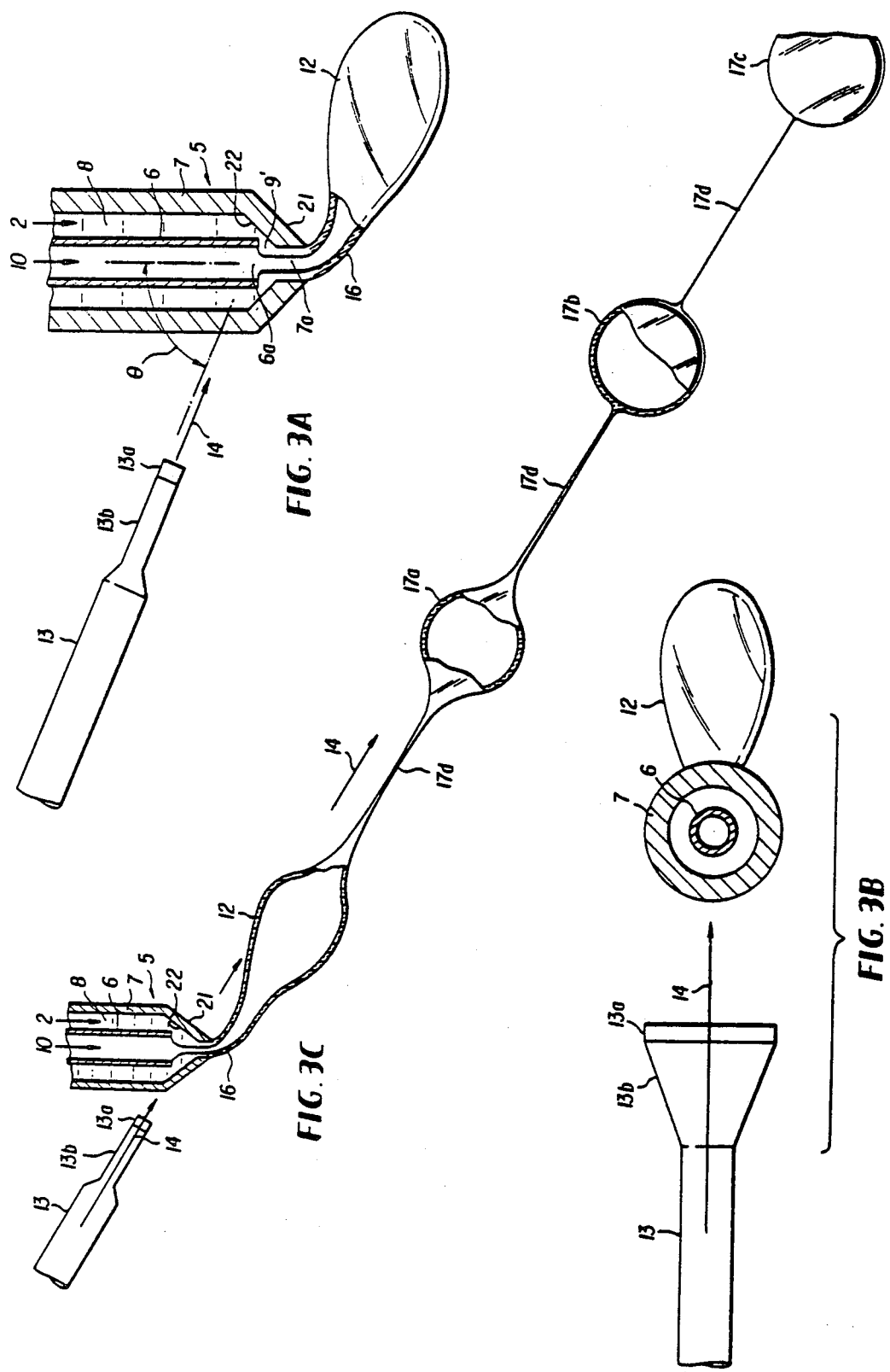

HOLLOW PLASTIC MICROSPHERES

This is a division, of application Ser. No. 059,296, filed July 20, 1979, which application is a continuation-in-part of applicant's applications Ser. Nos. 937,123 and 944,643, filed Aug. 28, 1978 and Sept. 21, 1978, respectively all abandoned.

SUMMARY OF THE INVENTION

The present invention relates to hollow microspheres made from organic film forming materials and compositions and particularly to hollow plastic microspheres and to a process and apparatus for making the microspheres.

The present invention relates to hollow plastic microspheres for use as a filler material in plastics, in plastic foam compositions and in concrete and asphalt compositions.

The present invention relates to a method and apparatus for using a coaxial blowing nozzle to blow microspheres from liquid plastic compositions comprising subjecting the microsphere during its formation to an external pulsating or fluctuating pressure field having periodic oscillations, said pulsating or fluctuating pressure field acting on said microsphere to assist in its formation and to assist in detaching the microsphere from said blowing nozzle.

The invention more particularly relates to a method and apparatus for blowing the microspheres from organic film forming materials or compositions and particularly to blowing microspheres from liquid plastic compositions using a coaxial blowing nozzle and a blowing gas or a blowing gas containing dispersed metal particles and/or an organo metal compound to blow the liquid plastic to form a hollow plastic microsphere. The metal particles deposit and/or the organo metal compound decomposes to deposit a thin transparent or reflective metal coating on the inner wall surface of the microsphere. A transverse jet is used to direct an entraining fluid over and around the blowing nozzle at an angle to the axis of the blowing nozzle. The entraining fluid as it passes over and around the blowing nozzle envelops and acts on the liquid plastic as it is being blown to form the microsphere and to detach the microsphere from the coaxial blowing nozzle. Quench or heating means are disposed close to and below the blowing nozzles to direct a quench or heating fluid onto the microspheres to rapidly cool or heat and cure, solidify and harden the microspheres.

The present invention also relates to hollow plastic microspheres having a thin transparent metal coating deposited on the inner wall surface of the microsphere.

The present invention also relates to hollow plastic microspheres having a thin reflective metal coating deposited on the inner wall surface of the microsphere.

The present invention specifically relates to the use of the hollow plastic microspheres in the manufacture of improved insulation materials for use in construction of homes, factories and office buildings and in the manufacture of products in which heat barriers are desired or necessary.

The present invention specifically relates to the use of the hollow plastic microspheres as filler materials in syntactic foam systems.

The present invention also relates to a method and apparatus for making filamented plastic microspheres with thin plastic filaments connecting adjacent microspheres and to the filamented microspheres themselves.

The hollow plastic microspheres of the present invention, depending on their diameter and their wall thickness and the particular composition from which they are made, are capable of withstanding relatively high external pressures and/or weight. Hollow plastic microspheres can be made that are resistant to relatively high temperatures and stable to many chemical agents and weathering conditions. These characteristics make the microspheres suitable for a wide variety of uses.

BACKGROUND OF THE INVENTION

In recent years the substantial increases in costs of basic materials such as plastics, cement, asphalt and the like has encouraged development and use of filler materials to reduce the amount and cost of the basic materials used and the weight of the finished materials.

The substantial increases in the energy costs of heating and cooling has encouraged the development of new and better insulation materials and many new insulation materials and insulating systems using the new materials have been developed in an attempt to satisfy these needs.

One of the newly suggested filler materials and insulating materials utilizes hollow plastic microspheres. The known methods for producing hollow plastic microspheres, however, have not been successful in producing microspheres of uniform size or uniform thin walls which makes it very difficult to produce filler and insulation materials of controlled and predictable physical and chemical characteristics and quality. Also, the relatively high cost and the relatively small size of the prior art microspheres has limited their use.

One of the existing methods of producing hollow plastic microspheres, for example, as disclosed in the Veatch et al U.S. Pat. No. 2,797,201, is to disperse a liquid or solid gas-phase precursor material in a plastic material to be blown to form the microspheres. The plastic material containing the solid or liquid gas-phase precursor enclosed therein is then heated to convert the solid or liquid gas-phase precursor material into a gas and is further heated to expand the gas and produce the hollow plastic microsphere containing therein the expanded gas. This process is, understandably, difficult to control and inherently produces plastic microspheres of random size and wall thickness, microspheres with walls that have sections or portions of the walls that are relatively thin, walls that have holes, small trapped bubbles, trapped or dissolved solvents or gases, any one or more of which will result in a substantial weakening of the microspheres, and a substantial proportion of the microspheres which are not suitable for use and must be scrapped or recycled.

Further, the use of conventional fiberglass insulation is being questioned in the light of the recently discovered possibility that fiberglass of certain particle size may be carcinogenic in the same or similar manner as asbestos. The use of polyurethane foams, urea-formaldehyde foams and polystyrene foams as insulating materials have recently been criticized because of their dimensional and chemical instability, for example, a tendency to shrink and to evolve the blowing gases such as Freon and to evolve unreacted gases such as formaldehyde.

In addition, in some applications, the use of low density microspheres presents a serious problem because they are difficult to handle since they are readily elutriated and tend to blow about. In situations of this type, the filamented microspheres of the present invention provide a convenient and safe method of handling the microspheres.

Thus, the known methods for producing hollow plastic microspheres have therefore not been successful in producing microspheres of uniform size or uniform thin walls or in producing hollow plastic microspheres of controlled and predictable physical and chemical characteristics, quality and strength or at low cost.

OBJECTS OF THE INVENTION

It is an object of the present invention to provide a process and an apparatus for making hollow plastic microspheres.

It is another object of the present invention to make hollow plastic microspheres for use as and/or in filler materials.

It is another object of the present invention to produce in an economical simple manner hollow plastic microspheres which are substantially spherical in shape, uniform in size, wall thickness, and strength characteristics.

It is another object of the present invention to produce hollow plastic microspheres having uniform thin walls which walls are substantially free of trapped gas bubbles or dissolved gases which can form bubbles and/or escape.

It is another object of the present invention to produce hollow plastic microspheres which are substantially resistant to heat, chemical agents and alkali materials.

It is still another object of the present invention to utilize the hollow plastic microspheres in the manufacture of syntactic foam systems and/or molded forms or shapes.

It is another object of the present invention to produce hollow plastic microspheres having thin walls of a low heat conductivity plastic.

It is another object of the present invention to produce hollow plastic microspheres having a low heat conductivity gas contained within the microspheres.

It is another object of the present invention to produce hollow plastic microspheres having deposited on the inner wall surface thereof a thin transparent metal coating.

It is another object of the present invention to produce hollow plastic microspheres having deposited on the inner wall surface thereof a low emissivity reflective metal coating.

It is another object of the present invention to produce hollow plastic filamented microspheres with a thin plastic filament connecting adjacent plastic microspheres.

It is another object of the present invention to utilize the hollow plastic microspheres of the present invention in the manufacture of improved insulating materials and insulating systems.

It is still another object of the present invention to utilize the hollow plastic microspheres in the manufacture of improved insulation materials for use in the construction of formed wall panels.

It is another object of the present invention to produce hollow plastic microspheres by using apparatus which does not employ moving parts, thereby substantially facilitating the manufacture of the microspheres at ambient or elevated temperatures and at ambient and elevated pressures under carefully controlled conditions and in an economical manner which lends itself to commercial large scale production of microspheres.

BRIEF DESCRIPTION OF THE INVENTION

The present invention relates to hollow plastic microspheres and to a process and apparatus for making the microspheres. The present invention more particularly relates to the use of hollow plastic microspheres in the manufacture of improved filler materials and insulation materials and insulating systems.

The hollow plastic microspheres of the present invention are made by forming a liquid film of thermoplastic or thermosetting plastic composition across a coaxial blowing nozzle, applying a gas or a gas containing dispersed metal particles and/or a gaseous organo metal compound at a positive pressure to the inner surface of the plastic film to blow the film and form an elongated cylinder shaped liquid film of plastic which is closed at its outer end. A balancing gas pressure is provided in the area of the blowing nozzle into which the elongated cylinder shaped liquid plastic film is blown.

A transverse jet is used to direct an entraining fluid over and around the blowing nozzle at an angle to the axis of the blowing nozzle. The entraining fluid as it passes over and around the blowing nozzle and the elongated cylinder fluid dynamically induces a pulsating or fluctuating pressure field at the opposite or lee side of the blowing nozzle in the wake or shadow of the blowing nozzle. The fluctuating pressure field has regular periodic oscillations similar to those of a flag flapping in a breeze. The transverse jet entraining fluid can also be pulsed at regular intervals to assist in controlling the size of the microspheres and in separating the microspheres from the blowing nozzle and the distance or spacing between microspheres. The entraining fluid envelops and acts asymmetrically on the elongated cylinder and causes the cylinder to flap, fold, pinch and close-off at its inner end at a point proximate to the coaxial blowing nozzle. The continued movement of the entraining fluid over the elongated cylinder produces asymmetric fluid drag forces on the cylinder and closes and detaches the elongated cylinder from the coaxial blowing nozzle to have it fall from the blowing nozzle. The surface tension forces of the plastic act on the entrained elongated cylinder and cause the cylinder to seek a minimum surface area and to form a spherical shape.

Quench nozzles where the plastic is thermoplastic and heating nozzles where the plastic is thermosetting are disposed below and on either side of the blowing nozzle and direct cooling or heating fluid at and into contact with the plastic microspheres to rapidly cool or heat and cure and solidify the plastic and form a harden, smooth hollow plastic microsphere. Where a thermosetting plastic is used, the microspheres are heated and cured and the cured plastic microspheres can be subsequently cooled.

The microspheres can be made from a low heat conductivity plastic composition and can contain a low heat conductivity gas. The microspheres can also be made to contain a thin metal coating deposited on the inner wall surface of the microspheres. The metal coating, depending on its thickness, can be transparent or reflective. The use of a reflective metal coating improves the insulating and heat reflecting characteristics of the microspheres.

The plastic microspheres of the present invention can be used to form a heat barrier by using them to fill void spaces between existing walls or other spaces and by forming them into sheets or other shaped forms to be used as insulation barriers. When used to form insulation barriers, the interstices between the microspheres can be filled with a low heat conductivity gas, a foam or other material all of which increase the heat insulation characteristics of the materials made from the microspheres.

In one embodiment of the invention, the microspheres are coated with an adhesive or foam filler and flattened to an oblate spheroid or a generally cellular shape. The microspheres are held in the flattened position until the adhesive hardens and/or cures after which the microspheres retain their flattened shape. The use of the flattened microspheres substantially reduces the volume of the interstices between the microspheres and significantly improves the thermal insulating characteristics of the microspheres.

The microspheres can be made from plastic compositions selected for their desired optical and chemical properties and for the particular gaseous material to be contained therein.

Where a gas containing dispersed metal particles is used to blow the microspheres, a metal layer is deposited on the inner wall surface of the microsphere as a thin metal coating. Where a gaseous organo metal compound is used to deposit the metal layers, a gaseous organo metal compound is used as or with the blowing gas to blow the microspheres. The organo metal compound can be decomposed just prior to blowing the microspheres or after the microspheres are formed by, for example, subjecting the blowing gas or the microspheres to heat and/or an electrical discharge.

The filamented microspheres are made in a manner such that they are connected or attached to each other by a thin continuous plastic filament. The filamented microspheres can be flattened to produce the oblate spheroids. The filaments interrupt and reduce the area of wall to wall contact between the microspheres and reduce the thermal conductivity between the walls of the microspheres. The filamented microspheres also assist in handling and preventing scattering of microspheres, particularly where very small diameter microspheres or low density microspheres are produced. The filamented microspheres have a distinct advantage over the simple addition of filaments in that the continuous filaments do not tend to settle in the systems in which they are used.

THE ADVANTAGES

The present invention overcomes many of the problems associated with prior attempts to produce hollow plastic microspheres. The process and apparatus of the present invention allows the production of hollow plastic microspheres having predetermined characteristics such that improved filler materials and insulating materials and insulating systems can be designed, manufactured and tailor made to suit a particular desired use. The diameter and wall thickness uniformity, and the thermal, strength and chemical resistance characteristics of the plastic microspheres can be determined by carefully selecting the plastic and constituents of the plastic composition and controlling the blowing gas pressure and temperature, and the temperature, viscosity and thickness of the liquid plastic film from which the microspheres are formed. The inner volume of the microspheres may contain an inert low heat conductivity gas used to blow the microsphere. The hollow plastic microspheres of the present invention can have a transparent metal coating deposited on the inner wall surface thereof which allows visual light to pass through the microspheres but reflects and traps infrared radiations. The hollow plastic microspheres can also have a low emissivity reflective metal coating deposited on the inner wall surface of the microsphere which effectively reflects visual light and radiant heat energy.

The process and apparatus of the present invention provide a practical and economical means by which hollow plastic microspheres having a high heat insulation efficiency can be utilized to prepare a relatively low cost efficient insulating material for common every day uses. The present invention also allows the economic production of hollow plastic microspheres from plastic compositions which incorporates a metallic radiation barrier and can be used as an insulation material.

The process and apparatus of the present invention, as compared to the prior art processes of using a latent liquid or solid blowing agent, can be conducted at higher temperatures since there is no included expandible and/or decomposable blowing agent used. The ability to use higher blowing temperatures results in for particular plastic compositions a lower viscosity for the plastic composition which allows surface tension forces to produce significantly greater uniformity in wall thickness, sphericity and diameter of the microspheres produced.

The present invention also allows the use of a wide variety of blowing gases and/or blowing gas materials. In accordance with the present invention, a wide variety of gaseous material blowing gas can be encapsulated, i.e. it is no longer required to use a latent liquid or solid blowing agent as the blowing gas.

The apparatus and process of the present invention provide for the production of hollow plastic microspheres at economic prices and in large quantities. The process and apparatus of the present invention allows the production of hollow plastic microspheres having predetermined diameters, wall thicknesses, strength and resistance to chemical agents and weathering and gas permeability such that superior systems can be designed, manufactured and tailor made to suit a particular desired use.

BRIEF DESCRIPTION OF THE DRAWINGS

The present invention as illustrated in the attached drawings represent exemplary forms of the method and apparatus for making microspheres for use in and as filler materials and for use in and as insulating materials.

The FIG. 1 of the drawings shows in cross-section an apparatus having multiple coaxial blowing nozzle means for supplying the gaseous material for blowing hollow plastic microspheres, a transverse jet providing an entraining fluid to assist in the formation and detachment of the microspheres from the blowing nozzles, and means for supplying a quench or heating fluid to cool or heat the microspheres.

Figure 1:
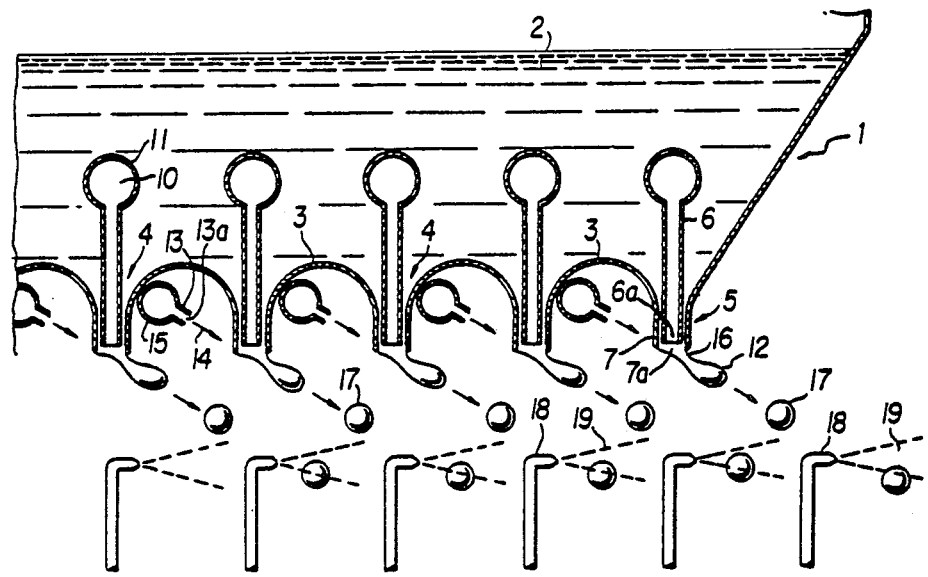
Figure 2:
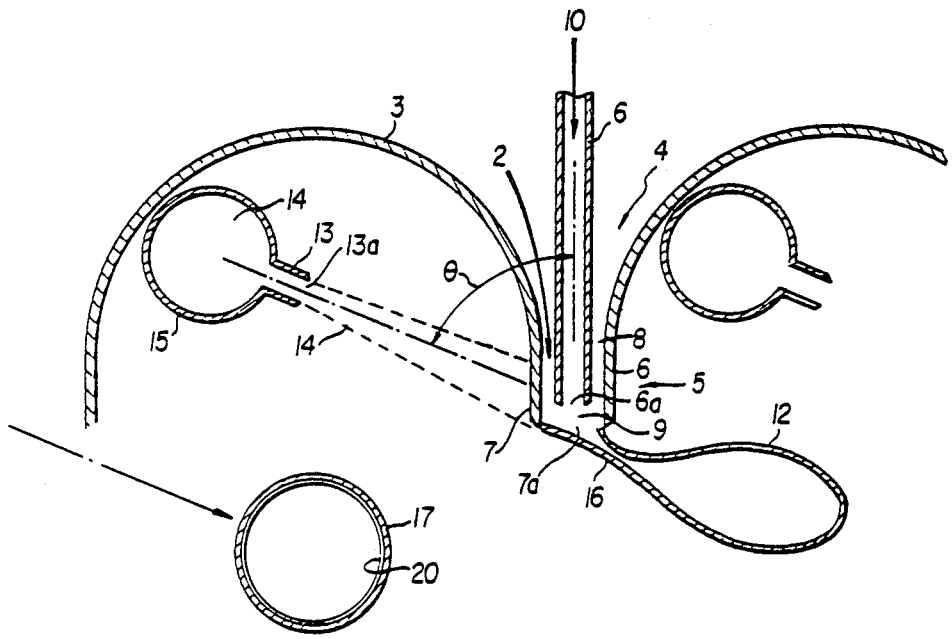
Figure 2:
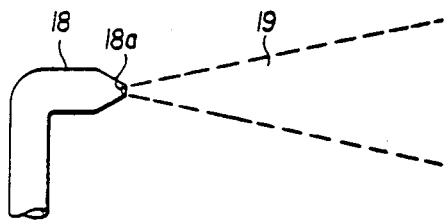

The FIG. 2 of the drawings is an enlarged detailed cross-section of the nozzle means of apparatus shown in FIG. 1.

Figures 3, 4:
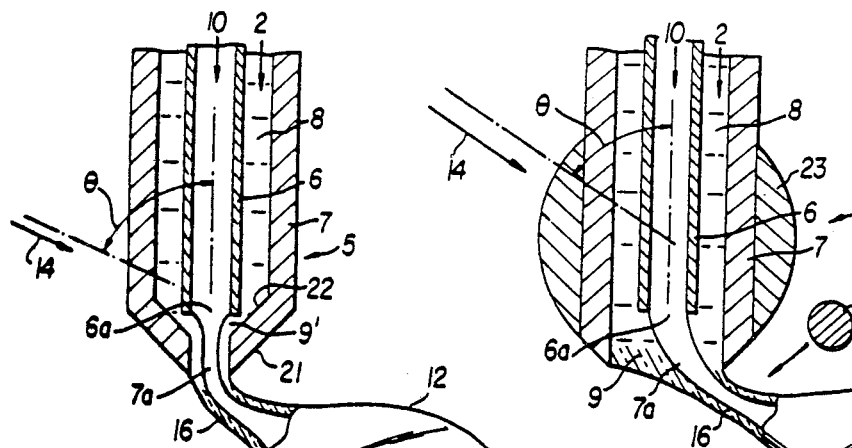

The FIG. 3 of the drawings is a detailed cross-section of a modified form of the nozzle means shown in FIG. 2 in which the lower end of the nozzle means is tapered inwardly.

The FIG. 3a of the drawings is a detailed cross-section of a modified transverse jet entraining means having a flattened orifice opening and the FIG. 3 nozzle means.

The FIG. 3b of the drawings is a top plane view of the modified transverse jet entraining means and the nozzle means illustrated in FIG. 3a of the drawings.

The FIG. 3c of the drawings illustrates the use of the apparatus of FIG. 3b to make filamented hollow plastic microspheres.

The FIG. 4 of the drawings is a detailed cross-section of a modified form of the nozzle means shown in FIG. 2 in which the lower portion of the nozzle is enlarged.

Figure 5:
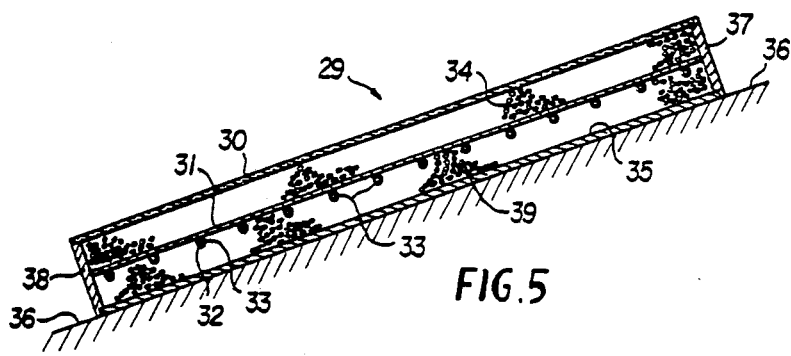

The FIG. 5 of the drawings shows a cross-section of an end view of a flat plate solar energy collector using the hollow plastic microspheres of the present invention.

Figure 6:
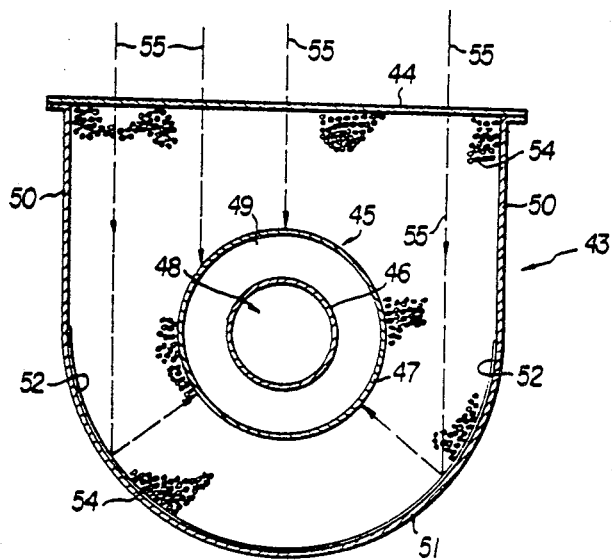

The FIG. 6 of the drawings shows a cross-section of an end view of a tubular solar energy collector using the hollow plastic microspheres of the present invention.

Figure 7:
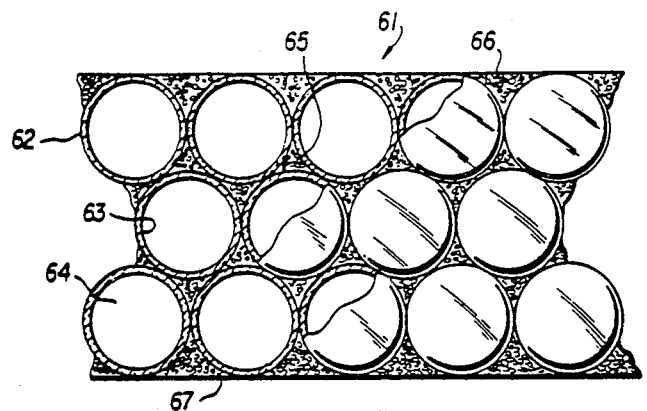

The FIG. 7 of the drawings shows a cross-section of spherical shaped hollow plastic microspheres made into a formed panel.

Figure 7A:
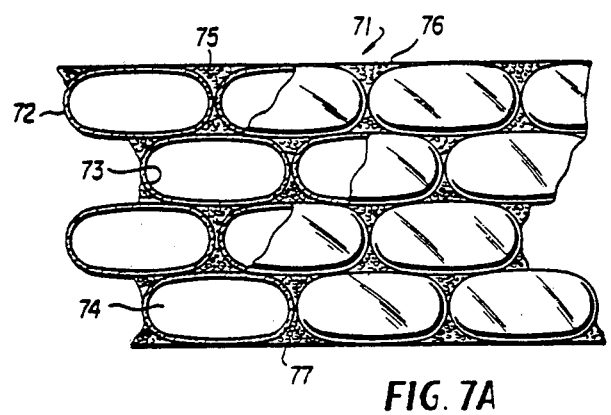

The FIG. 7a of the drawings shows a cross-section of oblate spheroid shaped hollow plastic microspheres made into a formed panel.

Figure 7B:
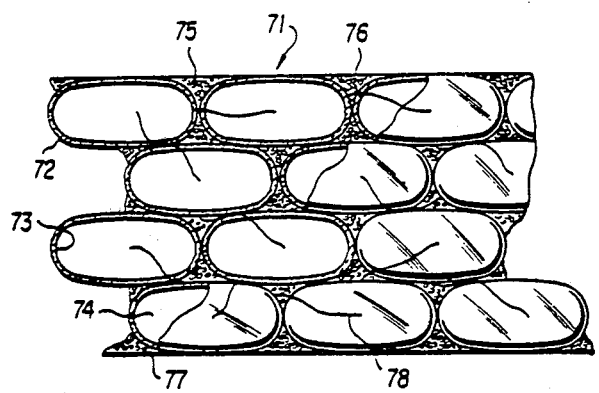

The FIG. 7b of the drawings shows a cross-section of oblate spheroid shaped hollow plastic filamented microspheres made into a formed panel in which the filaments interrupt the microsphere wall to wall contact.

DETAILED DISCUSSION OF THE DRAWINGS

The invention will be described with reference to the accompanying Figures of the drawings wherein like numbers designate like parts throughout the several views.

Referring to FIGS. 1 and 2 of the drawings, there is illustrated a vessel 1, made of suitable container material heated, as necessary, by means not shown for holding a liquid plastic 2. The bottom floor 3 of vessel 1 contains a plurality of openings 4 through which liquid plastic 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for a blowing gas and an outer nozzle 7 having an orifice 7a for liquid plastic. The inner nozzle 6 is disposed within and coaxial to outer nozzle 7 to form annular space 8 between nozzles 6 and 7, which annular space provides a flow path for liquid plastic. The orifice 6a of inner nozzle 6 terminates at or a short distance above the plane of orifice 7a of outer nozzle 7.

The liquid plastic 2 at about atmospheric pressure or at elevated pressure flows downwardly through annular space 8 and fills the area between orifice 6a and 7a. The surface tension forces in the liquid plastic 2 from a thin liquid plastic film 9 across orifices 6a and 7a.

A blowing gas 10 and/or blowing gas containing dispersed metal particles, which is at or below ambient temperature or which is heated by means not shown to about the temperature of the liquid plastic and which is at a pressure above the liquid plastic pressure at the blowing nozzle, is fed through distribution conduit 11 and inner coaxial nozzle 6 and brought into contact with the inner surface of the liquid plastic film 9. The blowing gas exerts a positive pressure on the liquid plastic film to blow and distend the film outwardly to form an elongated cylinder shaped liquid film 12 of plastic filled with the blowing gas. The elongated cylinder 12 is closed at its outer end and is connected at its inner end to outer nozzle 7 at the peripheral edge of orifice 7a. A balancing pressure of a gas or of an inert gas, i.e. a slightly lower pressure, is provided in the area of the blowing nozzle into which the elongated cylinder shaped liquid film is blown. The illustrated coaxial nozzle can be used to produce microspheres having diameters three to five times the size of the inside diameter of orifice 7a and is useful in blowing low viscosity plastic materials.

A transverse jet 13 is used to direct an inert entraining fluid 14, which is at about, below or above the temperature of the liquid plastic 2. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microsphere forming region at and behind the orifice 7a. The entraining fluid 14 as it passes over and around blowing nozzle 5 fluid dynamically induces a pulsating or fluctuating pressure field in the entraining fluid 14 at the opposite or lee side of blowing nozzle 5 in its wake or shadow.

The entraining fluid 14 envelops and acts on the elongated cylinder 12 in such a manner as to and causes the cylinder to flap, fold, pinch and close-off at its inner end at a point 16 proximate to the orifice 7a of outer nozzle 7. The continued movement of the entraining fluid 14 over the elongated cylinder 12 produces fluid drag forces on the cylinder 12 and detaches it from the orifice 7a of the outer nozzle 7 to allow the cylinder to fall. The surface tension forces of the liquid plastic act on the entrained, falling elongated cylinder 12 and cause the cylinder to seek a minimum surface area and to form a spherical shape hollow plastic microsphere 17.

Quench or heating nozzles 18 having orifices 18a are disposed below and on both sides of coaxial blowing nozzle 5 and direct cooling or heating fluid 19 at and into contact with the liquid plastic microsphere 17 to rapidly cool or heat and cure and solidify the liquid plastic and form a smooth, hardened, hollow plastic microsphere. The quench or heating fluid 19 also serves to carry the hollow plastic microspheres away from the coaxial blowing nozzle 5. Sufficient heating and curing time can be provided by using a heated fluidized bed, heated liquid carrier or belt carrier system for the thermosetting hollow plastic microspheres to cure and harden the microspheres with substantially little or no distortion or effect on the size or shape of the microspheres. Where the plastic is thermosetting, the heated and cured plastic microspheres can be subsequently cooled. The solidified and hardened hollow plastic microspheres are collected by suitable means not shown.

The FIG. 3 of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 6 with orifice 7a'. The figure of the drawings also shows elongated cylinder shaped liquid film 12 with a pinched portion 16.

The use of the tapered nozzle 21 construction was found to substantially assist in the formation of a thin plastic film 9' in the area between orifice 6a of inner nozzle 6 and orifice 7a' of outer nozzle 7. The inner wall surface 22 of the taper portion 21 of the outer nozzle 7 when pressure is applied to liquid plastic 2 forces the liquid plastic 2 to squeeze through a fine gap formed between the outer edge of orifice 6a, i.e. the outer edge of inner nozzle 6, and the inner surface 22 to form the thin liquid plastic film 9' across orifices 6a and 7a'. The formation of the liquid plastic film 9' does not in this embodiment rely solely on the surface tension properties of the liquid plastic. The illustrated coaxial nozzle can be used to produce microspheres having diameters three to five times the size of the diameter of orifice 7a of coaxial nozzle 7 and allows making microspheres of smaller diameter than those made using the FIG. 2 apparatus and is particularly useful in blowing high viscosity plastic materials.

The diameter of the microsphere is determined by the diameter of orifice 7a'. This apparatus allows the use of larger inner diameters of outer nozzle 7 and larger inner diameters of inner nozzle 6, both of which reduce the possibility of plugging of the coaxial nozzles when in use. These features are particularly advantageous when the blowing gas contains dispersed metal particles and/or the plastic compositions contain additive material particles.

The FIGS. 3a and 3b of the drawings illustrate another preferred embodiment of the invention in which the outer portion of the transverse jet 13 is flattened to form a generally rectangular or oval shaped orifice opening 13a. The orifice opening 13a can be disposed at an angle relative to a line drawn through the central axis of coaxial nozzle 5. The preferred angle, however, is that as illustrated in the drawing. That is, at an angle of about 90° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the hollow microspheres at the opposite or lee side of the blowing nozzle 5. By the use of the flattened transverse jet and increasing the amplitude of the pressure fluctuations, the pinching action exerted on the cylinder 12 is increased. This action facilitates the closing off of the cylinder 12 at its inner pinched end 16 and detaching of the cylinder 13 from the orifice 7a of the center nozzle 7.

The FIG. 3c of the drawings illustrates another preferred embodiment of the present invention in which a high viscosity plastic material is used to blow hollow plastic filamented microspheres. In this Figure, the elongated shaped cylinder 12 and plastic microspheres 17a, 17b and 17c are connected to each other by thin plastic filaments 17d. As can be seen in the drawing, as the microspheres 17a, 17b and 17c progress away from blowing nozzle 5 surface tension forces act on the elongated cylinder 12 to effect the gradual change of the elongated shaped cylinder 12 to the generally spherical shape 17a, more spherical shape 17b and finally the spherical shape microsphere 17c. The same surface tension forces cause a gradual reduction in the diameter of the connecting filaments 17d, as the distance between the microspheres and filaments and the blowing nozzle 5 increases. The hollow plastic microspheres 17a, 17b and 17c that are obtained are connected by thin filament portions 17d that are substantially of equal length and that are continuous with the plastic microsphere.

The operation of the apparatus illustrated in FIGS. 3, 3a, 3b and 3c otherwise than discussed above is similar to that discussed with regard to FIGS. 1 and 2 of the drawings.

The FIG. 4 of the drawings illustrates an embodiment of the invention in which the lower portion of the coaxial nozzle 7 is provided with a bulbous member 23 which imparts to the outer nozzle 7 an expanded spherical shape. This embodiment as in the previous embodiments comprises coaxial blowing nozzle 5 which consists of inner nozzle 6 with orifice 6a and outer nozzle 7 with orifice 7a. The Figure of the drawings also shows elongated cylinder shaped liquid film 12 with the pinched portion 16.

The use of the bulbous spherical shaped member 23 is found for a given velocity of entraining fluid 14 (FIG. 2) to substantially increase the amplitude of the pressure fluctuations included in the region of the formation of the hollow microspheres at one opposite or lee side of the blowing nozzle 5. By the use of the bulbous member 23 and increasing the amplitude of the pressure fluctuations, the pinching action exerted on the elongated cylinder 12 is increased. This action facilitates the closing off of the cylinder 12 at its inner pinched end 16 and detaching the cylinder 12 from the orifice 7a of the outer nozzle 7.

In still another embodiment of the invention which is also illustrated in FIG. 4 of the drawings, a beater bar 24 can be used to assist in detaching the cylinder 12 from orifice 7a. The beater bar 24 is attached to a spindle, not shown, which is caused to rotate in a manner such that the beater bar 24 is brought to bear upon the pinched portion 16 of the elongated cylinder 12 and to thus facilitate the closing off of the cylinder 12 at its inner pinched end 16 and detaching the cylinder 12 from the orifice 7a of outer nozzle 7.

The embodiments of the invention illustrated in the FIGS. 2 to 4 can be used singly or in various combinations as the situation may require. The entire apparatus can be enclosed in a high pressure containment vessel, not shown, which allows the process to be carried out at elevated pressures.

The FIG. 5 of the drawings illustrates the use of the hollow plastic microspheres of the present invention in the construction of a flat plate solar energy collector 29. The drawing shows a cross-section taken from an end view of the solar collector. The outer cover member 30 protects the solar collector from the weather elements. The cover 30 can be made from clear glass or plastic. The cover member 30 can also be made from several layers of light transparent hollow plastic microspheres of this invention bonded together with a transparent polyacrylate or polymethyl acrylate resin to form a transparent cover. There is disposed below and parallel to cover 30 a black coated flat metal plate absorber 31 to which there is bonded to the bottom surface thereof a multiplicity of evenly spaced heat exchange medium 32 containing tubes 33. The heat exchange medium can, for example, be water and the tubes 33 are interconnected by conventional means not shown to allow for the flow of the heat exchange medium 32 through the tubes 33. In order to minimize heat loss from the solar collector and increase its efficiency, the space between the outer cover 30 and the flat plate absorber 31 can also be filled with a bed of light transparent hollow plastic microspheres 34 of the present invention. The solar collector 29 has an inner cover member 35 by means of which the collector can be attached to a roof 36 of a home. To further decrease the heat loss of the solar collector and increase its efficiency, the space between the lower surface of the flat plate absorber 31 and the inner cover member 35 can be filled with reflective hollow plastic microspheres 39 containing on the inner wall surface thereof a visible light and infrared radiation reflective metal coating. The end members 37 and 38 of the solar collector 29 close-off the top and bottom edges of the collector.

The construction and operation of the flat plate solar collector are otherwise essentially the same as the know flat plate solar collector.

The FIG. 6 of the drawings illustrates the use of the hollow plastic microspheres of the present invention in the construction of a tubular solar energy collector 43. The drawing shows a cross-section taken from an end view of the solar collector. The outer cover member 44 can be made from clear glass or plastic. The cover member 44 can also be made from several layers of light transparent hollow plastic microspheres of this invention bonded together with a transparent polyester or polyolefin resin to form a transparent cover. There is disposed below and parallel to cover 30 a double pipe tubular member 45. The tubular member 45 consists of an inner feed tube 46 and an outer return tube 47. The heat exchange medium 48, for example water, is fed through inner feed tube 46, passes to one end of the tube where it reverses its direction of flow, by means not shown, and the heat exchange medium 49 (return) passes back through the return tube 47. The inner feed tube 46 is coaxial to the outer return tube 47. The outer return tube 47 has on its outer surface a black heat absorbing coating. The heat exchange medium in passing through feed tube 46 and return tube 47 is heated.

The tubular collector 43 has outer parallel side covers 50 and a lower outer curved cover portion 51. The lower curved cover portion 51 is concentric with the inner tube 46 and outer tube 47. The inner surface of the lower portion 51 is coated with a reflecting material 52 such that the sun's rays are reflected and concentrated in the direction of the black heat absorbing surface coating of return tube 47. In order to minimize heat loss from the solar collector and increase its efficiency, the entire area between the outer covers 44, 50 and 51 and the return tube 47 can be filled with a bed of the visible light transparent hollow plastic microspheres 54 of the present invention.

The tubular solar collector 43 is normally mounted in groups in a manner such that they intercept the movement of the sun across the sky. The sun's rays pass through the transparent microspheres 54 and impinged directly on the outer side of the return tube 47 and are reflected by reflector 52 and impinged on the lower side of return tube 47.

The construction and operation of the tubular solar collector are otherwise essentially the same as the known tubular solar collectors.

The FIG. 7 of the drawings illustrates the use of the hollow plastic mircospheres of the present invention in the construction of a formed panel 61. The panel contains multiple layers of uniform sized plastic microspheres 62. The microspheres can have a thin deposited layer 63 of a reflecting metal deposited on their inner wall surface. The internal volume of the microspheres can be filled with a low heat conductivity gas 64 and the interstices 65 between the microspheres can be filled with the same gas or a low heat conductivity foam containing a low heat conductivity gas. The facing surface 66 can be coated with a thin layer of plaster suitable for subsequent sizing and painting and/or covering with wall paper. The backing surface 67 can be coated with the same or different plastic from which the microspheres are made to form a vapor barrier or with plaster or with both materials.

The FIG. 7a of the drawings illustrates the use of the hollow plastic microspheres of the present invention in the construction of a formed panel 71. The panel contains multiple layers of uniform sized flattened oblate spheroid or rectangular shaped microspheres 72. The oblate spheroid shaped microspheres can have an inner thin deposited layer 73 of a reflective metal. The internal volume of the microsphere can be filled with a low heat conductivity gas 74. The flattened configuration of the microspheres substantially reduces the volume of the interstices between the microspheres which can be filled with a low heat conductivity foam 75. The facing 76 can be coated with a thin layer of plaster suitable for subsequent sizing and painting and/or covering with wall paper. The backing surface 77 can be coated with the same or different plastic from which the microspheres are made to form a vapor barrier or with plaster or with both materials.

The FIG. 7b of the drawings illustrates an embodiment of the formed wall panel of FIG. 7a in which filamented hollow plastic microspheres connected by very thin plastic filaments 78 are used. The thin plastic filaments 78 are formed between adjacent microspheres when and as the microspheres are blown and join the microspheres together. The connecting filaments 78 in the formed panel interrupt the wall to wall contact, i.e. the contact between the microspheres and serve to substantially reduce the conduction heat transfer between adjacent microspheres. The use of filamented microspheres to provide the interrupting filaments is particularly advantageous and preferred because the filaments are positively evenly distributed, cannot settle, are supplied in the desired controlled amount, and in the formed panel provide an interlocking structure which serves to strengthen the formed panel. The facing 76, as before, can be coated with a thin layer of plaster suitable for subsequent sizing and painting and/or covering with wall paper. The backing surface 77 can be coated with the same or different plastic from which the microspheres are made to form a vapor barrier or with plaster or with both materials.

ORGANIC FILM FORMING MATERIAL AND PLASTIC COMPOSITIONS

The organic film forming material and compositions and particularly the plastic compositions from which the hollow plastic microspheres of the present invention are made can be widely varied to obtain the desired physical characteristics for blowing and forming, cooling or heating and curing the microspheres and the desired heat insulating, strength, gas permeability and light transmission characteristics of the plastic microspheres produced.

The plastic compositions can be selected to have a low heat conductivity and sufficient strength when hardened, solidified and cured to support a substantial amount of external pressure or weight. The constitutents of the plastic compositions can vary widely, depending on their intended use and can include naturally occurring resins as well as synthetically produced plastic materials.

The constituents of the plastic compositions can be selected and blended to have high resistance to corrosive gaseous materials, high resistance to gaseous chemical agents, high resistance to alkali and weather, low susceptibility to diffusion of gaseous materials into and out of the plastic microspheres, and to be substantially free of trapped gas bubbles or dissolved gases in the walls of the microspheres which can form bubbles and to have sufficient strength when cured, hardened and solidified to withstand external pressure and/or weight.

The microspheres of the present invention are capable of contacting adjacent microspheres without significant wear or deterioration at the points of contact and are resistant to deterioration from exposure to moisture, heat and/or weathering.

The plastic compositions that can be used to form microspheres of the present invention include thermosetting and thermoplastic materials such as polyethylene, polypropylene, polystyrene, polyesters, polyurethanes, plychloro-trifluoro ethylene, polyvinyl fluoride, polyvinylidene, polymethyl methacrylate acetyl, phenol-formaldehyde resins and silicone and polycarbonate resins. The plastic compositions also include organic materials such as cellulose acetate, cellulose acetate-butyrate, and cellulose acetate-propionate. The plastic compositions may consist essentially of the plastic material or may contain the plastic material dissolved or dispersed in a suitable solvent.

Thermoplastic synthetic resins that can be used are polyvinyl resins, i.e. polyvinyl alcohol (water- or organic solvent-soluble), polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins.

Thermosetting resins that can be used are those in the thermoplastic water- or organic solvent-soluble stage of partial polymerization, the resins being converted after or during formation of the microspheres into a more or less fully polymerized solvent-insoluble stage. Other useful resins are alkyd, polysiloxane, phenol-formaldehyde, urea-formaldehyde and melamine-formaldehyde resins.

Natural film forming materials are also included within the scope of the form, including soybean protein, zein protein, alginates, and cellulose in solution as cellulose xanthate or cuprammonium cellulose.

The plastic compositions disclosed in Veatch et al U.S. Pat. No. 2,797,201 and the Morehouse, Jr. U.S. Pat. No. 3,615,972 can also be used in carrying out the present invention and the disclosures of said patents are accordingly incorporated herein in their entirety by reference.

There may be added to the plastic compositions chemical agents or additives which effect the viscosity of the compositions or of the surface film of the microsphere in order to obtain the desired viscosities needed to obtain a stable film for blowing the microspheres. Suitable chemical agents are materials that act as solvents for the plastic compositions. The solvents that are used will, of course, depend on the solubility in the solvent of the plastic composition used. Water, alcohols, ethers, esters, organic acids, hydrocarbons and chlorinated hydrocarbons can be used as solvents. To assist in the blowing and formation of the plastic microspheres, surface active agents, such as colloidal particles of insoluble substances and viscosity stabilizers can be added to the plastic composition as additives. These additives can affect the viscosity of the surface film of the microsphere to stabilize the film during film formation.

A distinct and advantageous feature of the present invention is that latent solid or latent liquid blowing gases are not used or required and that the microspheres that are produced are free of latent solid or latent liquid blowing gas materials or gases.

Additional plastic compositions suitable for use in the present invention are:

Thermoplastic resins: Epoxy resins, phenolformaldehyde resins, and Melmac;

Other resin compositions are: Elvanol, silicones, and Teflon.

For a more specific description of the above plastic and resin compositions see Zimmerman and Lavine, "Handbook of Material Trade Names", Vols. I-IV, 1953-1965.

The plastic compositions of the present invention are formulated to have a relatively narrow temperature difference between the liquid temperature and the plastic hardening temperature (thermoplastic) or a relatively narrow temperature difference between the liquid temperature and the thermosetting and curing temperature. The plastic compositions are formulated such that they have a high rate of viscosity increase with the hardening temperature or the thermosetting temperature such that the microsphere walls will solidify, harden and strengthen before the blowing gas within the sphere decreases in volume and pressure a sufficient amount to cause the microsphere to collapse. Where it is desirous to maintain a positive pressure in the contained volume of the microspheres, the permeability of the contained gases can be decreased in the manner discussed below.

The use of Saran plastic compositions is found to produce microspheres that are useful as filler materials. The polystyrene plastic compositions can be used to make microspheres for use as improved insulating materials. The polyethylene plastic compositions can be advantageously used to make microspheres for use as filler materials in plastic molding compositions. The polypropylene plastic compositions can be used to make microspheres for use as aggregate in concrete.

The plastic compositions from which the hollow plastic microsphere can be made are, depending on the particular plastic materials used, to some degree permeable to the gas materials used to blow the microspheres and/or to the gases present in the medium surrounding the microspheres. The gas permeability of the plastic compositions can be reduced and/or substantially eliminated by the addition, prior to blowing the microspheres, to the plastic composition of very small inert laminar plane-orientable additive material particles. Suitable additive particles are mica, graphite and aluminum leaf powders. When any one or more of these laminar plane-orientable additive material particles are added to a plastic composition prior to the blowing and formation of the hollow plastic microspheres, the process of making the microsphere aligns the laminar particles, as the plastic film is stretched in passing, i.e. extruded, through the conical blowing nozzle, with the walls of the hollow plastic microsphere and normal to the gas diffusion direction. The presence of the laminar plane particles in the microsphere walls substantially diminishes the gas permeability of the plastic film. The sizes of the additive particles are advantageously selected to be less than one-half the thickness of the wall of the microspheres. The gas permeability of certain plastics may be further diminished or reduced by subjecting the microspheres to ionization radiation to promote cross-linking of the plastic molecules.

BLOWING GAS

The hollow plastic microspheres used to make insulating materials can be blown with an inert gas or gas containing dispersed metal particles or a mixture thereof. The gases that are used to blow the microspheres are selected to have a low heat conductivity and generally involve heavy molecules which do not transfer heat readily. Suitable blowing gases can be argon, xenon, Freon gases, nitrogen, and sulfer dioxide. The blowing gas is selected to have the desired internal pressure when cooled to ambient temperatures. Blowing gases can also be selected that react with the plastic microspheres, e.g. to assist in the hardening and/or curing of the microspheres or to make the microsphere less permeable to the contained blowing gases. For certain uses, oxygen or air can be used as or added to the blowing gas.

A blowing gas containing dispersed metal particles can be used to obtain in the contained volume of the microsphere a deposit of a thin metal coating on the inner wall surface of the hollow plastic microsphere. The thickness of metal coating deposited will determine whether the metal coating is transparent or reflective of visible light. The blowing gases can also be selected to react with the deposited thin metal layer to obtain desired characteristics in the metal layer. For example, to reduce the thermal conductivity of the metal layer.

The metal used to coat the inner wall surface of the hollow plastic microspheres is selected to have the desired emissivity, low heat conduction characteristics, and to adhere to the inner wall surface of the plastic microspheres. The thickness and the nature of the deposited metal coating will depend to some extent upon the metal, the particle size of the metal used, the size of the microsphere and the amount of dispersed metal particles used.

The dispersed metal particle size can be 25 Å to 10,000 Å, preferably 50 Å to 5,000 Å and more preferably 100 Å to 1,000 Å. A sufficient amount of the metal is dispersed in the blowing gas to obtain the desired thickness of the deposited metal. The dispersed metal particles can advantageously be provided with an electrostatic charge to assist in depositing them on the inner wall surface of the microspheres.

Metal particles such as aluminum, silver, nickel, zinc, antimony, barium, cadmium, cesium, bismuth, selenium, lithium, magnesium. potassium, and gold can be used. Aluminum, zinc and nickel, however, are preferred. Dispersed metal oxide particles can in a similar manner be used to obtain similar effects to that of the metals. In addition, the metal oxide particles can be used to produce a deposited film of lower heat conductivity characteristics.

The thin metal coating can also be deposited on the inner wall surface of the microsphere by using as or with blowing gas organo metal compounds that are gases at ambient temperatures or that become gases on heating. Of the organo metal compounds available, the organo carbonyl compounds are preferred. Suitable organo metal carbonyl compounds are nickel and iron.

The organo metal compounds can be decomposed by heating just prior to blowing the microspheres to obtain finely dispersed metal particles and a decomposition gas or product. The decomposition gas, if present, can be used to assist in blowing the microspheres. The dispersed metal particles from decomposition of the organo metal compound, as before, deposit to form the thin metal layer. Alternatively, the microsphere, after being formed and containing the gaseous organo metal compound blowing gas, can be subjected to "electrical discharge" means which decomposes the organo metal compound to form the finely dispersed metal particles and the decomposition gas or product.

The thickness of the deposited metal layer will depend primarily on the partial pressure of the gaseous organo metal blowing gas and the inside diameter of the microsphere.

An auxiliary blowing gas, e.g. an inert blowing gas, can be used to dilute the gaseous organo metal compound blowing gas in order to control the thickness of the deposited metal layer. There can also be used as an auxiliary blowing gas, a gas that acts as a catalyst or hardening agent for the plastic compositions. The addition of the catalyst or hardening agent to the blowing gas prevents contact of the catalyst or hardening agent with the plastic composition until a time just before the microsphere is formed.

The entraining fluid, e.g. an inert entraining fluid, can be a gas at a high or low temperature and can be selected to react with or be inert to the plastic composition. Suitable entraining fluids are nitrogen, air, steam and argon. A gaseous catalyst for the plastic can also be included in the entraining fluid.

The quench or heating fluid can be a liquid, a liquid dispersion or a gas. Suitable quench or heating fluids are steam, a fine water spray, air, nitrogen or mixtures thereof. The selection of a specific quench or heating fluid and quench or heating temperature depends to some extent on the plastic composition from which the microspheres are made and the blowing gas temperature and pressure.

PROCESS CONDITIONS

The organic film forming materials and/or plastic compositions of the present invention are in a liquid-fluid form at the desired blowing temperature and during the blowing operation. The liquid plastic composition can be at a temperature of about 0° C. to about 400° C., preferably 10° C. to 300° C. and more preferably 20° C. to 200° C., depending on the constituents and state of polymerization of, for example, the plastic composition. The plastic composition at the blowing temperature is liquid, fluid and flows easily. The liquid plastic just prior to the blowing operation can have a viscosity of 0.10 to 600 poises, usually 10 to 350 poises and more usually 30 to 200 poises.

Where the process is used to make non-filamented microspheres, the liquid plastic just prior to the blowing operation can have a viscosity of 0.1 to 200 poises, preferably 0.5 to 100 poises, and more preferably 5.0 to 50 poises.

Where the process is used to make filamented microspheres, the liquid plastic just prior to the blowing operation can have a viscosity of 50 to 600 poises, preferably 100 to 400 poises, and more preferably 150 to 300 poises. The viscosity can be measured by conventional means, e.g. using a Broofield viscometer.

A critical feature of the present invention is that the formation of the hollow plastic microspheres can be carried out at low viscosities relative to the viscosities heretofore used in the prior art processes that utilized latent liquid or solid blowing agents dispersed throughout or contained in the plastic compositions used to blow the microspheres. Because of the ability to utilize comparatively low viscosities, applicant is able to obtain hollow plastic microspheres, the walls of which are free of any entrapped or dissolved gases or bubbles. With the low viscosities used by applicant, any entrapped or dissolved gases diffuse out and escape from the plastic film surface during the bubble formation. With the high viscosities required to be used in the prior are processes, any dissolved gaseous bubbles are trapped in the walls of the plastic microspheres as they are formed because of the high viscosities required to be used.

The liquid plastic fed to the coaxial blowing nozzle can be at about ambient pressure or can be at an elevated pressure. The liquid plastic feed can be at a pressure of 1 to 20,000 p.s.i.g., usually 3 to 10,000 p.s.i.g. and more usually 5 to 5,000 p.s.i.g.

Where the process is used to make microspheres for use as insulating materials and in insulating systems, for use in syntactic foam systems and as filler materials in general, the liquid plastic fed to the coaxial blowing nozzle can be at a pressure of 1 to 1,000 p.s.i.g., preferably at 3 to 100 p.s.i.g., and more preferably at 5 to 50 p.s.i.g.

The liquid plastic is continuously fed to the coaxial blowing nozzle during the blowing operation to prevent premature breaking and detaching of the elongated cylinder shaped liquid plastic film as it is being formed by the blowing gas.

The blowing gas or gaseous material blowing gas will be at about the same temperature as the liquid plastic being blown. The blowing gas or gaseous material blowing gas temperature can, however, be at a higher temperature than the liquid plastic to assist in maintaining the fluidity of the hollow liquid plastic microsphere during the blowing operation or can be at a lower temperature than the liquid plastic to assist in the solidification and hardening of the hollow liquid plastic microsphere as it is formed. The pressure of the blowing gas or gaseous material blowing gas is sufficient to blow the microsphere and will be slightly above the pressure of liquid plastic film at the orifice 7a of the outer nozzle 7. The blowing gas pressure will also depend on and be slightly above the ambient pressure external to the blowing nozzle.

The temperatures of the gaseous material blowing gases will depend on the blowing gas used and the viscosity-temperature-shear relationship for the plastic materials used to make the microspheres.

The pressure of the blowing gas or gaseous material blowing gas is sufficient to blow the microsphere and will be slightly above the pressure of liquid plastic at the orifice 7a of the outer nozzle 7. Depending on the gaseous material to be encapsulated within the hollow plastic microspheres, the blowing gas or the gaseous material can be at a pressure of 1 to 20,000 p.s.i.g., usually 3 to 10,000 p.s.i.g. and more usually 5 to 5,000 p.s.i.g.

The blowing gas or gaseous material blowing gas can also be at a pressure of 1 to 1,000 p.s.i.g., preferably 3 to 100 p.s.i.g. and more preferably 5 to 50 p.s.i.g.

Where the process is used to make microspheres for use as insulating materials and in insulating systems, for use in syntactic foam systems and as filler materials in general, the blowing gas or gaseous material blowing gas can be at a pressure of 1 to 125 p.s.i.g., preferably at 2 to 100 p.s.i.g. and more preferably at 5 to 30 p.s.i.g.

The pressure of the blowing gas containing dispersed metal particles alone and/or in combination with the principle blowing gas is sufficient to blow the microsphere and the combined gas pressure will be slightly above the pressure of the liquid plastic at the orifice 7a of the outer nozzle 7. The pressure of the combined mixture of the blowing gases will also depend on and be slightly above the ambient pressure external to the blowing nozzle.

The ambient pressure external to the blowing nozzle can be at about atmospheric pressure or can be at subatmospheric or super-atmospheric pressure. The ambient pressure external to the blowing nozzle will be such that it substantially balances, but is slightly less than the blowing gas pressure.

The transverse jet entraining fluid which is directed over and around the coaxial blowing nozzle to assist in the formation and detaching of the hollow liquid plastic microsphere from the coaxial blowing nozzle can have a linear velocity in the region of microsphere formation of 1 to 120 ft/sec, usually 5 to 80 ft/sec and more usually 10 to 60 ft/sec.

Where the process if used to make non-filamented microspheres, the linear velocity of the transverse jet fluid in the region of microsphere formation can be 30 to 120 ft/sec, preferably 40 to 100 ft/sec and more preferably 50 to 80 ft/sec.

Where the process is used to make filamented microspheres, the linear velocity of the transverse jet fluid in the region of microsphere formation can be 1 to 50 ft/sec, preferably 5 to 40 ft/sec and more preferably 10 to 30 ft/sec.

Further, it is found (FIGS. 2 to 4) that pulsing the transverse jet entraining fluid at a rate of 2 to 1500 pulses/sec, preferably 50 to 1000 pulses/sec and more preferably 100 to 500 pulses/sec assits in controlling the diameter of the microspheres and detaching the microspheres from the coaxial blowing nozzle.

The distance between filamented microspheres depends to some extent on the viscosity of the plastic and the linear velocity of the transverse jet entraining fluid.

The entraining fluid can be at the same temperature as the liquid plastic being blown. The entraining fluid can, however, be at a higher temperature than the liquid plastic to assist in maintaining the fluidity of the hollow liquid plastic microsphere during the blowing operation or can be at a lower temperature than the liquid plastic to assist in the stabilization of the forming film and the solidification and hardening of the hollow liquid plastic microsphere as it is formed.

The quench or heating fluid is at a temperature such that it rapidly cools or heats the microspheres to solidify, harden and strengthen the liquid plastic before the inner gas pressure decreases to a value at which the plastic microsphere would collapse or burst the microsphere. The quench cooling fluid can be at a temperature of 0° to 200° F., usually 40° to 200° F. and more usually 50° to 100° F. The heating fluid can be at a temperature of 100° to 800° F., usually 200° to 600° F. and more usually 300° to 500° F., depending on the plastic composition.

The quench cooling fluid very rapidly cools the outer liquid plastic surface of the microsphere with which it is in direct contact and more slowly cools the blowing gas enclosed within the microsphere because of the lower thermal conductivity of the gas. This cooling process allows sufficient time for the plastic walls of the microspheres to strengthen before the gas is cooled and the pressure within the plastic microsphere is substantially reduced.

The time elapsed from commencement of the blowing of the plastic microspheres to the cooling and initial hardening of the microspheres can be 0.0001 to 60.0 seconds, preferably 0.0010 to 30.0 seconds and more preferably 0.10 to 10.0 seconds.

Where a thermosetting plastic composition is used to form the microsphere, the time elapsed from commencement of the blowing of the plastic microsphere to the heating and curing of the microsphere for it to have sufficient strength to maintain its size and shape can be 0.10 second to 30 minutes, preferably 1 second to 20 minutes and more preferably 10 seconds to 10 minutes.

The filamented microsphere embodiment of the invention provides a means by which the microspheres may be suspended and allowed to harden and/or cure without being brought into contact with any surface. The filamented microspheres are simply drawn on a blanket or drum and are suspended between the blowing nozzle and the blanket or drum for a sufficient period of time for them to harden and/or cure.

APPARATUS

Referring to FIGS. 1 and 2 of the drawings, the vessel 1 is constructed to maintain the liquid plastic at the desired operating temperatures. The liquid plastic 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.020 inch and an outer nozzle 7 having an inside diameter of 0.420 to 0.020 inch, preferably 0.260 to 0.025 and more preferably 0.130 to 0.030 inch. The inner nozzle 6 and outer nozzle 7 form annular space 8 which provides a flow path through which the liquid plastic 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifices 7a at a distance of 0.001 to 0.125 inch, preferably 0.002 to 0.050 inch and more preferably 0.003 to 0.025 inch. The liquid plastic 2 flows downwardly and is extruded through annular space 8 and fills the area between orifice 6a and 7a. The orifices 6a and 7a can be made from stainless steel, platinum alloys, glass or fused alumina. Stainless steel, however, is preferred. The surface tension forces in the liquid plastic 2 form a thin liquid plastic film 9 across orifices 6a and 7a which has about the same or a smaller thickness as the distance of orifice 6a is spaced above orifice 7a. The liquid plastic film 9 can be 25 to 3175 microns, preferably 50 to 1270 microns, and more preferably 76 to 635 microns thick.

The FIG. 2 blowing nozzle can be used to blow liquid plastic at relatively low viscosities, for example, of 10 to 60 poises and to blow hollow plastic microspheres of relatively thick wall size, for example, of 20 to 100 microns or more.

A blowing gas or gaseous material blowing gas is fed through inner coaxial nozzle 6 and brought into contact with the inner surface of liquid plastic film 9. The blowing gas or gaseous material blowing gas exerts a positive pressure on the liquid plastic film to blow and distend the film outwardly and downwardly to form an elongated cylinder shaped liquid film 12 of liquid plastic filled with the inert blowing gas or gaseous material blowing gas 10. The elongated cylinder 12 is closed at its outer end and is connected to outer nozzle 7 at the peripheral edge of orifice 7a.

The transverse jet 13 is used to direct an inert entraining fluid 14 through nozzle 13 and transverse jet nozzle orifice 13a at the coaxial blowing nozzle 5. The coaxial blowing nozzle 5 has an outer diameter of 0.52 to 0.030 inch, preferably 0.36 to 0.035 inch and more preferably 0.140 to 0.040 inch.

The process of the present invention was found to be very sensitive to the distance of the transverse jet 13 from the orifice 7a of outer nozzle 7, the angle at which the transverse jet was directed at coaxial blowing nozzle 5 and the point at which a line drawn through the center axis of transverse jet 13 intersected with a line drawn through the center axis of coaxial nozzle 5. The transverse jet 13 is aligned to direct the flow of entraining fluid 14 over and around outer nozzle 7 in the microsphere forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersect of a line drawn along the center axis of transverse jet 13 and a line drawn along the center axis of coaxial blowing nozzle 5. The center axis of transverse jet 13 is aligned at an angle of 15° to 85°, preferably 25° to 75° and more preferably 35° to 55° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 at a point above the orifice 7a of outer nozzle 7 which is 0.5 to 4 times, preferably 1.0 to 3.5 times and more preferably 2 to 3 times the outside diameter of the coaxial blowing nozzle 5. The transverse jet entraining fluid acts on the elongated shaped cylinder 12 to flap and pinch it closed and to detach it from the orifice 7a of the outer nozzle 7 to allow the cylinder to fall, i.e. be transported away from the outer nozzle 7 by the entraining fluid.

The transverse jet entraining fluid as it passes over and around the blowing nozzle fluid dynamically induces a periodic pulsating or fluctuating pressure field at the opposite or lee side of the blowing nozzle in the wake or shadow of the coaxial blowing nozzle. A similar periodic pulsating or fluctuating pressure field can be produced by a pulsating sonic pressure field directed at the coaxial blowing nozzle. The entraining fluid assists in the formation and detaching of the hollow plastic microsphere from the coaxial blowing nozzle. The use of the transverse jet and entraning fluid in the manner described also discourages wetting of the outer wall surface of the coaxial blowing nozzle 5 by the fluid plastic being blown. The wetting of the outer wall disrupts and interfers with blowing the microspheres.

The quench or heating nozzles 18 are disposed below and on both sides of the coaxial blowing nozzle 5 a sufficient distance apart to allow the microspheres 17 to fall between the quench nozzles 18. The inside diameter of quench nozzle orifices 18a can be 0.1 to 0.75 inch, preferably 0.2 to 0.6 inch and more preferably 0.3 to 0.5 inch. The quench nozzles 18 direct cooling or heating fluid 19 at and into contact with the liquid plastic microspheres 17 at a velocity of 2 to 14, preferably 3 to 10 and more preferably 4 to 8 ft/sec to rapidly cool or heat and solidify the liquid plastic and form a hard, smooth hollow plastic microsphere.

The FIG. 3 of the drawings illustrates a preferred embodiment of the invention. It is found that in blowing high viscosity liquid plastic compositions that it is advantageous to immediately prior to blowing the liquid plastic to provide by extrusion a very thin liquid plastic film for blowing into the elongated cylinder shape liquid film 12. The thin liquid film 9' is provided by having the lower portion of the outer coaxial nozzle 7 tapered downwardly and inwardly at 21. The tapered portion 21 and inner wall surface 22 thereof can be at an angle of 15° to 75°, 30° to 60° and preferably about 45° relative to the center axis of coaxial blowing nozzle 5. The orifice 7a' can be 0.10 to 1.5 times, preferably 0.20 to 1.1 times and more preferably 0.25 to 0.8 times the inner diameter of orifice 6a of inner nozzle 6.

The thickness of the liquid plastic film 9' can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the liquid plastic 2 through annular space 8 the liquid plastic 2 can be squeezed or extruded through the very fine gap to form a relatively thin liquid plastic film 9'.

The proper gap can best be determined by pressing the inner coaxial nozzle 6 downward with sufficient pressure to completely block-off the flow of plastic, and to then very slowly raise the inner coaxial nozzle 6 until a stable system is obtained, i.e. until the microspheres are being formed.

The tapered nozzle construction illustrated in FIG. 3 is as mentioned above the preferred embodiment of the invention. This embodiment can be used to blow plastic compositions at relatively high viscosities as well as to blow plastic compositions at the relatively low viscosities referred to with respect to FIG. 2 of the drawings. The FIG. 3 embodiment of the invention is of particular advantage in blowing the thin walled microspheres for use in or as insulating materials.

When blowing high or low viscosity plastic compositions, it was found to be advantageous to obtain the very thin liquid plastic film and to continue during the blowing operation to supply liquid plastic to the elongated cylinder shaped liquid film as it was formed. Where a high pressure is used to squeeze, i.e. extrude, the liquid plastic through the very thin gap, the pressure of the inert blowing gas or gaseous material blowing gas is generally less than the liquid plastic feed pressure, but slightly above the pressure of the liquid plastic at the coaxial blowing nozzle.

The tapered nozzle configurated of FIG. 3 is also particularly useful in aligning the laminar plane-orientable plastic addtivie materials. The passage of the plastic material through the fine or narrow gap serves to align the additive materials with the walls of the microspheres as the microspheres are being formed.

The FIGS. 3a and 3b of the drawings also illustrate a preferred embodiment of the invention in which the transverse jet 13 can be flattened to form a generally rectangular or oval shape. The orifice 13a can also be flattened to form a generally oval or rectangular shape. The width of the orifice can be 0.96 to 0.030 inch, preferably 0.60 to 0.045 inch and more preferably 0.030 to 0.060 inch. The height of the orifice can be 0.32 to 0.010 inch, preferably 0.020 to 0.015 inch and more preferably 0.10 to 0.20 inch.

With reference to FIG. 3c of the drawings which illustrates an embodiment of the present invention in which a high viscosity plastic material is used to blow filamented hollow plastic microspheres, there is shown the formation of the uniform diameter microspheres spaced about equal distances apart. The numbered items in this drawing have the same means as discussed above with reference to FIGS. 1, 2, 3, 3a and 3b.

With reference to FIG. 4 of the drawings which illustrates another embodiment of the invention, it was found that in blowing the liquid plastic to foam the elongated cylinder shaped liquid film 12 that is was advantageous to increase the outer diameter of the lower portion coaxial blowing nozzle 5. One method of increasing the outer diameter of coaxial blowing nozzle 5 is by providing the lower portion of outer nozzle 7 with a bulbous member 23 which imparts to the lower portion of outer nozzle 7 a spherical shape. The use of the bulbous spherical shaped member 23 is found for a given velocity of the entraining fluid to substantially increase the amplitude of the pressure fluctuations induced in the region of the formation of the hollow microspheres. The diameter of the bulbous member 23 can be 1.25 to 4 times, preferably 1.5 to 3 times and more preferably 1.75 to 2.75 times the diameter of the outer diameter of coaxial blowing nozzle 5. When using a bulbous member 23, the transverse jet 13 is generally aligned such that a line drawn through the center axis of transverse jet 13 will pass through the center of bulbous member 23.

The FIG. 4 illustrates still another embodiment of the invention in which a beater bar 24 is used to facilitate detaching of the elongated cylinder shaped liquid film 12 from the orifice 7a of outer nozzle 7. The beater bar 24 is attached to a spindle, not shown, which is caused to rotate in a manner such that the beater bar 24 is brought to bear upon the pinched portion 16 of the elongated cylinder 12. The beater bar 24 is set to spin at about the same rate as the formation of hollow microspheres and can be 2 to 1500, preferably 10 to 800 and more preferably 20 to 400 revolutions per second. The beater bar 24 can thus be used to facilitate the closing off of the cylinder 12 at its inner pinched end 16 and to detach the cylinder 12 from the orifice 7a of outer nozzle 7.

DESCRIPTION OF THE MICROSPHERES

The hollow microspheres made in accordance with the present invention can be made from a wide variety of organic film forming materials and compositions particularly plastic compositions.

The hollow plastic microspheres made in accordance with the present invention can be made from suitable organic film forming compositions which are resistant to high temperatures and chemical attack and resistant to weathering as the situation may require.

The organic film forming compositions that can be used are those that have the necessary viscosities, as mentioned above, when being blown to form stable films and which have a rapid change from the molten or liquid state to the solid or hard state with a relatively narrow temperature change or within a relatively short cure time. That is, they change from liquid to solid within a relative narrowly defined temperature range and/or cure in a relatively short time.

The hollow plastic microspheres are substantially uniform in diameter and wall thickness, and depending on their composition and the blowing conditions are light transparent, translucent or opaque, soft or hard, and smooth or rough. The walls of the microspheres are free or substantially free of any holes, relatively thinned wall portions or sections, trapped gas bubbles, or sufficient amounts of dissolved gases or solvents to form bubbles. The microspheres are also free of any latent solid or liquid blowing gas materials or gases. The preferred plastic compositions are those that are resistant to chemical attack, elevated temperatures, weathering and diffusion of gases into and/or out of the microspheres. Where the blowing gases may decompose at elevated temperatures, plastic compositions that are liquid below the decomposition temperatures of the gases can be used.

The plastic microspheres can be made in various diameters and wall thickness, depending upon the desired end use of the microspheres. The microspheres can have an outer diameter of 200 to 10,000 microns, preferably 500 to 6,000 microns and more preferably 1,000 to 4,000 microns. The microspheres can have a wall thickness of 0.1 to 1,000 microns, preferably 0.5 to 400 microns and more preferably 1 and 100 microns.

The diameter and wall thickness of the hollow microspheres will of course affect the average bulk density of the microspheres. The microspheres can have an average bulk density of 0.2 to 15 $lb/ft^3$, usually 0.5 to 12 $lb/ft^3$ and more usually 0.75 to 9 $lb/ft^3$. For use in a preferred embodiment to make low density insulating materials, the hollow plastic microspheres can have an average bulk density as low as 0.5 to 1.5, for example, about 1.0 $lb/ft^3$.

The microspheres, because the walls are free or substantially free of any holes, thinned sections, trapped gas bubbles, and/or sufficient amounts of dissolved gases or solvents to form bubbles and are substantially stronger than the microspheres heretofore produced.

The microspheres made from thermoplastic compositions after being formed can be reheated to soften the plastic and enlarge the microspheres and/or to improve the surface smoothness of the microspheres. On reheating, the internal gas pressure will increase and cause the microsphere to increase in size. After reheating to the desired size, for example, in a "shot tower", the microspheres are rapidly cooled to retain the increase in size.

Where the microspheres are formed in a manner such that they are connected by continuous thin plastic filaments, that is they are made in the form of filamented microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/1000 to 1/30 of the diameter of the microspheres.

The microspheres can contain a gas at superatmospheric pressure, about ambient pressure or at partial vacuum.

Where the microspheres are used as insulating materials and in insulating systems, or in syntactic foam systems, or as filler material in general, the microspheres can have an outer diameter of 200 to 5,000, preferably 500 to 3,000 and more preferably 750 to 2,000 microns. These microspheres can have a wall thickness of 0.1 to 500 microns, preferably 0.5 to 200 microns and more preferably 1 to 50 microns. These microspheres can have an average bulk density of 0.3 to 15 $lb/ft^3$, preferably 0.5 to 10 $lb/ft^3$ and more preferably 0.75 to 5.0 $lb/ft^3$. These microspheres can have a contained gas pressure of 12 to 100 p.s.i.a., preferably 15 to 75 p.s.i.a. and more preferably 18 to 25 p.s.i.a.

In a preferred embodiment of the invention, the ratio of the diameter to the wall thickness of the microspheres is selected such that the microspheres are flexible, i.e. can be deformed under pressure without breaking.

The microspheres can contain a thin metal layer deposited on the inner wall surface of the microsphere where the blowing gas contains dispersed metal particles. The thickness of the thin metal coating deposited on the inner wall surface of the microsphere will depend on the amount and particle size of the dispersed metal particles or partial pressure of organo metal blowing gas that are used and the diameter of the microsphere. The thickness of the thin metal coating can be 25 to 10,000 Å, preferably 50 to 5,000 Å and more preferably 100 to 1,000 Å.

When it is desired that the deposited metal coating be transparent to light, the coating should be less than 100 Å and preferably less than 80 Å. The transparent metal coated microspheres can have a deposited metal coating 25 to 95 Å and preferably 50 to 80 Å thick. These microspheres, though transparent to visible light, are substantially reflective of infrared radiation.

When it is desired that the deposited metal coating be reflective to light, the coating can be more than 100 Å and preferably more than 150 Å thick. The reflective metal coated microspheres can have a deposited metal coating 105 to 600 Å, preferably 150 to 400 Å and more preferably 150 to 250 Å thick.

The thermal heat conductivity characteristics of heat barriers made from the microspheres can be further improved by partially flattening the microspheres into an oblate spheroid or generally rectangular shape. The thermal conductivity of the oblate spheroids is further improved by mixing with the oblate spheroids thin plastic filaments. The filaments are preferably provided in the form of the filamented microspheres.

The filamented microspheres can as they are formed be drawn and laid on a conveyor belt or drum. A sufficient amount of tension can be maintained on the filamented microspheres as they are drawn to stretch them into the oblate spheroid shape. The filamented microspheres are maintained in that shape for a sufficient period of time to harden and cure. After hardening of the filamented oblate spheroids, they can be laid in a bed, an adhesive and/or foam can be added and the filamented microspheres can be made into, e.g. a four by eight formed panel. The panel can be ¼ to 3 inches in thickness, for example, ½, 1, 1½ or 2 inches in thickness.

The thermal properties of the microspheres can also be improved by filling the interstices between the microspheres with a low thermal conductivity gas, finely divided inert particles, e.g. lamp black, a low conductivity foam, e.g. polyurethane, or polyolefin resin foam.

The hollow plastic microspheres of the present invention can be used to design systems having improved insulating characteristics. Where hollow microspheres are used in which the contained volume has a low heat conductivity gas, systems can be designed in which the thermal conductivity can be R5 to R9, for example, R8 per inch.

Where hollow plastic microspheres are used having a low heat conductivity gas and a low emissivity, reflective metal coating deposited on the inner wall surface thereof are used, systems can be designed in which the thermal conductivity can be R7 to R12, for example, R10 per inch.

Where an insulating system containing filamented oblate spheroids and a reflective metal coating deposited on the inner wall surface of the microsphere are used, systems can be designed in which the thermal conductivity can be R9 to R16, for example R14 per inch.

The microspheres can also be used as heat barriers by filling spaces between existing walls or other void spaces or can be made into sheets or other shaped forms by cementing the microspheres together with a suitable resin or other adhesive or by fusing the microspheres together and can be used in new construction.

When the hollow plastic microspheres are massed together to form a heat barrier, there is reduced heat transfer by solid conduction because of the point to point contact between adjacent spheres and the low conductivity of the plastic material used to form the spheres. There is little heat transfer by convection because the characteristic dimensions of the voids between the packed spheres are below that necessary to initiate convection. There is little heat transfer by gas conduction within the spheres when there is a low heat conductivity gas in the enclosed volume. Where there is a low emissivity, highly reflective metal layer deposited on the inner wall surface of the microspheres, there is substantially little radiant heat transfer because of the highly reflective metal layer on the inner wall surface of the spheres. A primary mode of heat transfer remaining, therefore, is by gas conduction in the interstices or voids between the microspheres. The overall conductivity of the system is lower than that of the voids gas because the voids gas occupies only a fraction of the volume of the total system, and because conduction paths through the voids gas are attentuated by the presence of the low conductivity microspheres and the filaments. The use of a low heat conductivity gas and/or a foam containing a low heat conductivity gas to fill the interstices between the microspheres further reduces the thermal conductivity of a bed of the microspheres.

The hollow plastic microspheres of the present invention have a distinct advantage of being strong and capable of supporting a substantial amount of weight. They can thus be used to make simple inexpensive self-supporting or load bearing systems.

The following examples are used to illustrate the invention.

EXAMPLES

The Examples 1-7 are illustrative of the use of the present invention to make insulating materials and/or systems.

EXAMPLE 1

A thermoplastic composition comprising the following constituents is used to make hollow plastic microspheres:

Polyethylene polymer

The plastic composition is heated to form a fluid plastic having a viscosity of 10 to 20 poises at the blowing nozzle.

The liquid plastic is fed to the apparatus of FIGS. 1 and 2 of the drawings. The liquid plastic passes through annular space 8 of blowing nozzle 5 and forms a thin liquid plastic film across the orifices 6a and 7a. The blowing nozzle 5 has an outside diameter of 0.040 inch and orifice 7a has an inside diameter of 0.030 inch. The thin liquid molten plastic film has a diameter of 0.030 inch and a thickness of 0.005 inch. A heated blowing gas consisting of argon or a low heat conductivity gas at a positive pressure is applied to the inner surface of the liquid plastic film causing the film to distend downwardly into a elongated cylinder shape with its outer end closed and its inner end attached to the outer edge of orifice 7a.

The transverse jet is used to direct an entraining fluid which consists of heated nitrogen over and around the blowing nozzle 5. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above the orifice 7a.

The entrained falling elongated cylinders assume a spherical shape, are cooled to about ambient temperature by a cool quench fluid consisting of a fine water spray which quickly cools, solidifies and hardens the plastic microspheres.

Uniform sized, smooth, hollow plastic microspheres having a 2000 to 3000 micron diameter, a 20 to 40 micron wall thickness and filled with argon or a low heat conductivity gas are obtained. The microspheres are closely examined and the walls are found to be free of any trapped gas bubbles.

EXAMPLE 2

A thermosetting plastic composition comprising a mixture of 50% by weight acrylonitrile and 50% by weight vinylidene chloride and a suitable catalyst is used to make hollow plastic microspheres.

The plastic composition mixture at the blowing nozzle has a viscosity of ten poises.

The liquid plastic mixture is heated and is fed to the apparatus of FIGS. 1 and 3 of the drawings. The liquid plastic is passed through annular space 8 of blowing nozzle 5 and into tapered portion 21 of outer nozzle 7. The liquid plastic under pressure is squeezed and extruded through a fine gap formed between the outer edge of orifice 6a and the inner surface 22 of the tapered portion 21 of outer nozzle 7 and forms a thin liquid plastic film across the orifices 6a and 7a'. The blowing nozzle 5 has an outside diameter of 0.04 inch and orifice 7a' has an inside diameter of 0.01 inch. The thin liquid plastic film has a diameter of 0.01 inch and thickness of 0.003 inch. A heated blowing gas consisting of argon or a low heat conductivity gas at a positive pressure is applied to the inner surface of the liquid plastic film causing the film to distend outwardly into an elongated cylinder shape with its outer end closed and its inner end attached to the outer edge of orifice 7a'.

The transverse jet is used to direct an entraining fluid which consists of heated nitrogen over and around the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The entrained falling elongated cylinders filled with the blowing gas quickly assume a spherical shape. The microspheres are contacted with a heating fluid consisting of heated nitrogen which solidifies, hardens and begins to cure the liquid plastic.

Uniform sized, smooth, hollow plastic microspheres having an about 800 to 900 micron diameter, a 8 to 20 micron wall thickness and an internal pressure of 12 p.s.i.a are obtained. The microspheres are examined and are found to be free of any trapped gas bubbles.

EXAMPLE 3

A thermosetting composition comprising a mixture of 90% by weight methyl methacrylate and 10% by weight styrene and a suitable catalyst is used to make low emissivity, reflective hollow plastic microspheres.

The plastic composition mixture has a viscosity of ten poises at the blowing nozzle.

The liquid plastic mixture is fed to the apparatus of FIGS. 1 and 3 of the drawings. The liquid plastic is heated to and is passed through annular space 8 of the blowing nozzle 5 and into tapered portion 21 of outer nozzle 7. The liquid plastic under pressure is squeezed through a fine gap formed between the outer edge of orifice 6a and the inner surface 22 of the tapered portion 21 of outer nozzle 7 and forms a thin liquid plastic film across the orifices 6a and 7a'. The blowing nozzle 5 has an outside diameter of 0.05 inch and orifice 7a' has an inside diameter of 0.03 inch. The thin liquid plastic film has a diameter of 0.03 inch and a thickness of 0.01 inch. A heated blowing gas consisting of argon or a low heat conductivity gas and containing finely dispersed aluminum particles 0.03 to 0.05 micron size and at a positive pressure is applied to the inner surface of the liquid plastic film causing the film to distend outwardly into an elongated cylinder shape with its outer end closed and its inner end attached to the outer edge of orifice 7a'.

The transverse jet is used to direct an inert entraining fluid which consists of heated nitrogen gas over and around the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The entrained falling elongated cylinders filled with the blowing gas containing the dispersed aluminum particles quickly assume a spherical shape. The microspheres are contacted with a heating fluid consisting of heated nitrogen which quickly solidifies, hardens and begins to cure the liquid plastic. The dispersed aluminum particles are deposited on and adhere to the inner wall surface of the plastic microsphere.

Uniform sized, smooth, hollow plastic microspheres having an about 3000 to 4000 micron diameter, a 30 to 40 micron wall thickness and having a low emissivity, reflective aluminum metal coating 600 Å to 1000 Å thick and an internal contained pressure of 12 p.s.i.a. are obtained. The microspheres are examined and are found to be free of any trapped gas bubbles.

EXAMPLE 4

An efficient flat plate solar energy collector, as illustrated in FIG. 5 of the drawings, is constructed using the plastic microsphere of the present invention as an improved insulating material.

In accordance with the present invention, the area between the outer cover and the upper surface of the black coated metal absorber plate is filled to a depth of about one inch with transparent plastic microspheres made by the method of Example 2 of about 800 micron diameter, 10 micron wall thickness and having an internal contained pressure of 10 p.s.i.a. These microspheres are transparent to visible light.

The area between the lower surface of the black coated metal absorber plate and the inner cover member is filled to a depth of about 1½ inches with the reflective plastic microspheres made by the method of Example 3 of about 3000 micron diameter, 30 micron wall thickness and having a thin low emissivity, reflective aluminum metal coating 700 Å thick and an internal contained pressure of 12 p.s.i.a.

EXAMPLE 5

An efficient tubular solar energy collector, as illustrated in FIG. 6 of the drawings, is constructed using the plastic microspheres of the present invention as an improved insulating material.

In accordance with the present invention, the volume between the outer cover, the sides and the lower curved portion and the double pipe tubular member is filled with transparent plastic microspheres made by the method of Example 2 to provide an about one inch layer of transparent plastic microspheres completely around the double pipe tubular member. The transparent plastic microspheres are 800 microns in diameter, have a wall thickness of 10 microns and an internal contained pressure of 12 p.s.i.a. These microspheres are transparent to visible light.

EXAMPLE 6

The FIG. 7 of the drawings illustrates the use of the hollow plastic microspheres of the present invention in the construction of a one-inch thick formed wall panel. The wall panel contains multiple layers of uniform size plastic microspheres made by the method of Example 3 of the invention. The microspheres have an about 3000 micron diameter, 30 micron wall thickness and a thin, low emissivity aluminum metal coating 700 Å thick deposited on the inner wall surface of the microsphere. The internal volume of the microspheres is filled with a low heat conductivity gas, e.g. Freon-11, and the interstices between the microspheres is filled with a low heat conductivity foam containing Freon-11 gas. The microspheres are treated with a thin adhesive coating of a similar composition to that from which the plastic microspheres were made and formed into a ⅞ inch thick layer. The adhesive is allowed to cure to form a semi-rigid wallboard. The facing surface of the wallboard is coated with an about ⅛ inch thick plaster which is suitable for subsequent sizing and painting and/or covering with wall paper. The backing surface of the panel is coated with an about 1/16 inch coating of the same plastic composition from which the microspheres are made. The final panels are allowed to cure. The cured panels form strong wall panels which can be sawed and nailed and readily used in construction of new homes. Several sections of the panels are tested and found to have a R value of 12 per inch.

EXAMPLE 7

The FIG. 7b of the drawings illustrates the use of the hollow plastic microspheres of the present invention in the construction of a formed wall panel one-inch thick. The wall panel contains hollow plastic microspheres made by the method of Example 3. The microspheres have a diameter of about 3000 micron, 30 micron wall thickness and a low emissivity aluminum metal coating 700 Å thick deposited on the inner wall surface of the microsphere. The microspheres are coated with an adhesive of similar composition to that from which the microspheres are made. A layer of microspheres about two inches thick is pressed and flattened between two flat plates to form the microspheres into an oblate spheroid or a general rectangular shape in which the ratio of the height to length of the flattened microspheres is 1:3. The flattened microspheres form a layer about ⅞ inch thick and are held in this position until the adhesive coating on the microspheres cure after which microspheres retain their flattened shape. The internal volume of the microspheres is filled with a low heat conductivity gas, e.g. Freon-11. The flattened configuration of the microspheres substantially reduces the volume of the interstices between the microspheres and any volume that remains is filled with a low heat conductivity foam containing Freon-11 gas. The facing surface of the wallboard is about ⅛ inch plaster which is suitable for subsequent sizing and painting and/or covering with wall paper. The backing of the wall panel is about a 1/16 inch coating of the plastic from which the microspheres are made. The panels are cured and form strong wall panels which can be sawed and nailed and readily used in construction of new homes. One of the important effects of compressing the microspheres is to significantly reduce the volume of the interstices between the microspheres to substantially reduce the heat loss by convection. Several sections of the panel are tested and found to have a R value of 10 per inch.

The formed panel of Examples 6 and 7 can also be made to have a density gradient in the direction of the front to back of the panel. Where the panel is used indoors the surface facing the room can be made to have a relatively high density and high strength, by increasing the proportion of resin or other binder to microspheres. The surface facing the outside can be made to have relatively low density and a high insulation barrier effect by having a high proportion of microspheres to resin or binder. For example, the front one third of the panel can have an average density of about two to three times that of the average density of the center third of the panel. The density of the back one third of the panel can be about one-half to one-third that of the center third of the panel. Where the panels are used on the outside of a house, the sides of the panel can be reversed, i.e. the high density side can face outward.

UTILITY

The hollow plastic microspheres of the present invention have many uses including the manufacture of improved insulating materials and the use of the microspheres as a filler or aggregate in cement, plaster and asphalt and synthetic construction board materials. The microspheres can also be used in the manufacture of insulated louvers and molded objects or forms.

The microsphere can be used to form thermal insulation barriers merely by filling spaces between the walls of refrigerator trucks or train cars, household refrigerators, cold storage building facilities, homes, factories and office buildings.

The hollow microspheres can be produced from high melting temperature and/or fire resistant plastic compositions and when used as a component in building construction retard the development and expansion of fires. The hollow plastic microspheres, depending on the plastic composition, are stable to many chemical agents and weathering conditions.

The microspheres can be bonded together by sintering or resin adhesives and molded into sheets or other forms and used in new constructions which require thermal insulation including homes, factories and office buildings. The construction materials made from the microspheres can be preformed or made at the construction site.

The microspheres may be adhered together with known adhesives or binders to produce semi- or rigid cellular type materials for use in manufacturing various products or in construction. The microspheres, because they can be made from very stable plastic compositions, are not subject to degradation by outgassing, aging, moisture, weathering or biological attack. The hollow plastic microspheres when used in manufacture of improved insulating materials can advantageously be used alone or in combination with fiberglass, styrofoam, polyurethane foam, phenol-formaldehyde foam, organic and inorganic binders.

The microspheres of the present invention can be used to make insulating material tapes and insulating, wallboard and ceiling tiles. The microspheres can also advantageously be used in plastic or resin boat construction to produce high strength hulls and/or hulls which themselves are buoyant.

The plastic compositions can also be selected to produce microspheres that will be selectively permeable to specific gases and/or organic molecules. These microspheres can then be used as semi-permeable membranes to separate gaseous or liquid mixtures.

The process and apparatus of the present invention can be used to blow microspheres from any suitable plastic material having sufficient viscosity at the temperature at which the microspheres are blown to form a stable elongated cylinder shape of the material being blown and to subsequently be detached to form the spherical shaped microspheres.

The plastic compositions can be transparent, translucent or opaque. A suitable coloring material can be added to the plastic compositions to aid in identification of microspheres of specified size and/or wall thickness.

In carrying out the process of the present invention, the plastic material to be used to form the microspheres is selected and can be treated and/or mixed with other materials to adjust their viscosity and surface tension characteristics such that at the desired blowing temperatures they are capable of forming hollow microspheres of the desired size and wall thickness.

The process and apparatus of the invention can also be used to form hollow microspheres from metals such as iron, steel, nickel, gold, copper, zinc, tin, brass, lead, aluminum and magnesium. In order to form microspheres from these materials, suitable additives are used which provide at the surface of a blown microsphere a sufficiently high viscosity that a stable microsphere can be formed.

The process of the present invention can also be carried out in a centrifuge apparatus in which the coaxial blowing nozzles are disposed in the outer circumferal surface of the centrifuge. Liquid plastic is fed into the centrifuge and because of centrifugal forces rapidly coats and wets the inner wall surface of the outer wall of the centrifuge. The liquid plastic is fed into the outer coaxial nozzle. The inlet to the inner coaxial nozzle is disposed above the coating of liquid plastic. The blowing gas is as before fed into the inner coaxial nozzle. The transverse jet entraining fluid is provided by transverse jets mounted on the outer surface of the rotating bowl. An external gas can be directed along the longitudinal axis of the centrifuge to assist in removing the microspheres from the vicinity of the centrifuge as they are formed. Quench and heating fluids can be provided as before.

These and other uses of the present invention will become apparent to those skilled in the art from the foregoing description and the following appended claims.

It will be understood that various changes and modifications may be made in the invention and that the scope thereof is not to be limited except as set forth in the claims.

I claim:

1. Hollow organic film forming material microspheres having a diameter of 200 to 10,000 microns and having a wall thickness of 0.1 to 1,000 microns, wherein said microspheres are free of latent solid or liquid blowing gas materials or gases and the walls of said microspheres are substantially free of holes, relatively thinned wall portions or sections and bubbles.

2. Hollow organic film forming material microspheres of substantially uniform diameter of 500 to 6,000 microns and of substantially uniform wall thickness of 0.5 to 400 microns, wherein said microspheres are free of latent solid or liquid blowing gas materials or gases and the walls of said microspheres are substantially free of holes, relatively thinned wall portions or sections and bubbles.

3. The hollow microspheres of claim 2 having a contained gas pressure of 15 to 75 p.s.i.a.

4. The hollow microspheres of claim 2 having deposited on the inner wall surfaces thereof a thin metal coating 50° to 5000° A thick.

5. The hollow microspheres of claim 2 having a diameter of 500 to 3,000 microns and a wall thickness of 0.5 to 200 microns.

6. The hollow microspheres of claim 2 wherein the microspheres have an average bulk density of 0.5 to 12 lb/ft$^3$.

7. A mass of the microspheres of claim 2.

8. The hollow microspheres of claim 2 having an oblate spheroid shape.

9. Filamented, hollow organic film forming material microspheres having a diameter of 200 to 10,000 microns and having a wall thickness of 0.1 to 1000 microns, wherein said microspheres are connected to each other by filament portions which are continuous with the microspheres and are of the same organic film forming material from which the microspheres are made.

10. Filamented, hollow organic film forming material microspheres having a diameter of 500 to 6000 microns and having a wall thickness of 0.5 to 400 microns, wherein said microspheres are connected to each other by filament portions which are continuous with the microspheres and are of the same organic film forming material from which the microspheres are made.

11. The hollow microspheres of claim 10 wherein the length of the connecting filaments is substantially equal and is 2 to 20 times the diameter of the microspheres.

12. The hollow microspheres of claim 10 wherein the length of the connecting filaments is substantially equal and the diameter of the connecting filaments is 1/2500 to 1/20 the diameter of the microspheres.

13. Hollow plastic microspheres having a diameter of 200 to 10,000 microns and having a wall thickness of 0.1 to 1,000 microns, wherein said microspheres are free of latent solid or liquid blowing gas materials or gases and the walls of said microspheres are substantially free of holes, relatively thinned wall portions or sections and bubbles.

14. Hollow plastic microspheres of substantially uniform diameter of 500 to 6,000 microns and of substantially uniform wall thickness of 0.5 to 400 microns, wherein said microspheres are free of latent solid or liquid blowing gas materials or gases and the walls of said microspheres are substantially free of holes, relatively thinned wall portions or sections and bubbles.

15. The hollow microspheres of claim 14 having a contained gas pressure of 5 to 7 p.s.i.a.

16. The hollow microspheres of claim 14 having a thin metal coating deposited on the inner wall surfaces of the microspheres consisting of a layer of dispersed metal particles 50° to 5000° A thick.

17. The hollow microspheres of claim 14 having deposited on the inner wall surfaces thereof a thin metal coating 100° to 10,000° A thick.

18. The hollow microspheres of claim 17 wherein the deposited metal is less than 100° A thick and is transparent to visible light.

19. The hollow microspheres of claim 17 wherein the deposited metal is more than 100° A thick and is reflective of visible light.

20. The hollow microspheres of claim 14 having a diameter of 500 to 3000 microns and a wall thickness of 0.5 to 200 microns.

21. The hollow microspheres of claim 14 having an average bulk density of 0.5 to 12 lb/ft$^3$.

22. A mass of the microspheres of claim 14.

23. The hollow microspheres of claim 14 having an oblate spheroid shape.

24. The hollow plastic microspheres of claim 14 wherein there is deposited on the inner wall surfaces a thin metal transparent coating 25° to 95° A thick.

25. The hollow plastic microspheres of claim 14 wherein there is deposited on the inner wall surfaces thereof a thin metal reflective coating 105° to 600° A thick.

26. The hollow microspheres of claim 14 wherein the microspheres have deposited on the inner wall surfaces thereof a thin metal coating 150° to 250° A thick.

27. The hollow microspheres of claim 14 wherein the microspheres have deposited on the inner wall surfaces thereof a thin metal coating 150° to 400° A thick.

28. Filamented, hollow plastic microspheres having a diameter of 200 to 10,000 microns and having a wall thickness of 0.1 to 1000 microns, wherein said microspheres are connected to each other by filament portions which are continuous with the microspheres and are of the same organic film forming material from which the microspheres are made.

29. Filamented, hollow plastic microspheres having a diameter of 500 to 6000 microns and having a wall thickness of 0.5 to 400 microns, wherein said microspheres are connected to each other by filament portions which are continuous with the microspheres and are of the same inorganic film forming material from which the microspheres are made.

30. The hollow microspheres of claim 29 having a contained gas pressure of 5 to 75 p.s.i.a.

31. The hollow microspheres of claim 29 having deposited on the inner wall surfaces thereof a thin metal coating 100° to 1000° A thick.

32. The hollow microspheres of claim 31 wherein the deposited metal is less than 100° A thick and is transparent to visible light.

33. The hollow microspheres of claim 31 wherein the deposited metal is more than 100° A thick and is reflective of visible light.

34. A mass of the microspheres of claim 29.

35. The hollow microspheres of claim 29 having an oblate spheroid shape.

36. The hollow microspheres of claim 29 wherein the length of the connecting filaments is substantially equal and is 2 to 20 times the diameter of the microspheres.

37. The hollow microspheres of claim 29 wherein the length of the connecting filaments is substantially equal and the diameter of the connecting filament is 1/2500 to 1/20 the diameter of the microspheres.

* * * * *